(12) United States Patent
Yasuike et al.

(10) Patent No.: US 8,801,937 B2
(45) Date of Patent: Aug. 12, 2014

(54) PROCESS FOR TREATMENT OF WATER CONTAINING AZOLE-TYPE ANTICORROSIVE FOR COPPER

(75) Inventors: Tomoharu Yasuike, Tokyo (JP); Atsushi Nemoto, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 457 days.

(21) Appl. No.: 12/998,583

(22) PCT Filed: Oct. 21, 2009

(86) PCT No.: PCT/JP2009/068112
§ 371 (c)(1),
(2), (4) Date: Jul. 26, 2011

(87) PCT Pub. No.: WO2010/058674
PCT Pub. Date: May 27, 2010

(65) Prior Publication Data
US 2012/0006755 A1    Jan. 12, 2012

(30) Foreign Application Priority Data
Nov. 19, 2008   (JP) ................. 2008-295757

(51) Int. Cl.
C02F 1/52 (2006.01)
C02F 1/78 (2006.01)
C02F 101/38 (2006.01)
C02F 103/34 (2006.01)

(52) U.S. Cl.
CPC ........... *C02F 1/5245* (2013.01); *C02F 1/78* (2013.01); *C02F 2101/38* (2013.01); *C02F 2103/346* (2013.01)

USPC .......... 210/723; 210/702; 210/710; 210/721; 210/724; 210/726; 210/729

(58) Field of Classification Search
None
See application file for complete search history.

(56) References Cited

U.S. PATENT DOCUMENTS

| 6,238,571 B1 | 5/2001 | Olmez et al. | |
| 7,361,279 B2 * | 4/2008 | Hernandez et al. | 210/668 |
| 2005/0067347 A1 * | 3/2005 | Vanhulle et al. | 210/606 |
| 2006/0243604 A1 * | 11/2006 | Nakagawa et al. | 205/775 |

FOREIGN PATENT DOCUMENTS

| JP | H09-174070 | 7/1997 |
| JP | H10-314763 A | 12/1998 |
| JP | 2001-334275 A | 12/2001 |

(Continued)

OTHER PUBLICATIONS

Machine Translation of JP 2006-051,468.*

(Continued)

*Primary Examiner* — Lore Jarrett
*Assistant Examiner* — Benjamin J Behrendt
(74) *Attorney, Agent, or Firm* — Manabu Kanesaka

(57) ABSTRACT

A process for treatment of water containing an azole-type anticorrosive for copper, includes adding ferrous ions to the water containing the azole-type anticorrosive for copper and having a pH of 4-8, thereby precipitating an insoluble iron-azole complex, and separating the insoluble iron-azole complex. An amount of the ferrous ions added is 0.5 to 5.0 times, by molar ratio, an amount of the azole-type anticorrosive for copper in the water containing the azole-type anticorrosive for copper. After the insoluble iron-azole complex is separated, remaining total organic carbon (TOC) components are subjected to an ozone treatment.

9 Claims, 1 Drawing Sheet

(56) References Cited

FOREIGN PATENT DOCUMENTS

| | | |
|---|---|---|
| JP | 2002-035773 | 2/2002 |
| JP | 2003-236571 A | 8/2003 |
| JP | 2005-326361 | 11/2005 |
| JP | 2006-051468 A | 2/2006 |
| JP | 2008-000653 A | 1/2008 |
| WO | WO 02/04359 A1 | 1/2002 |

OTHER PUBLICATIONS

Machine Translation of JP 2003-236,571.*
Machine Translation of JP H10-314,763.*
Human Translation of JP 2006-051468.*
Human Translation of JP 2003-236571.*
Human Translation of JP H10-314763.*
Japan Patent Office, "Office Action for JP 2008-295757", Jul. 9, 2013.

* cited by examiner

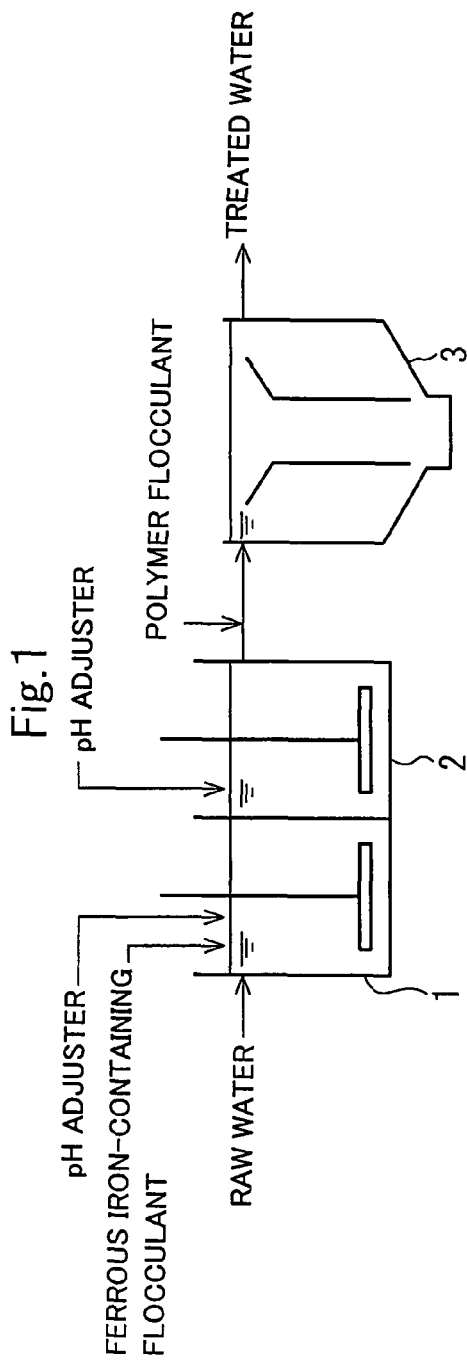
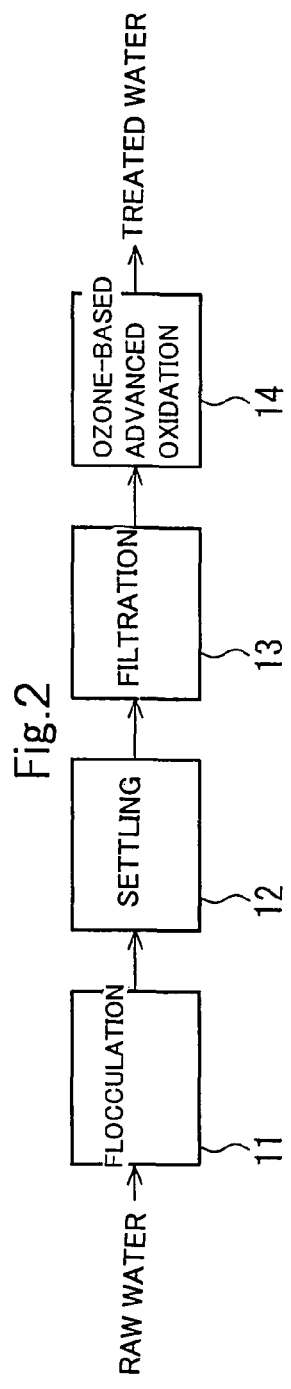

PROCESS FOR TREATMENT OF WATER CONTAINING AZOLE-TYPE ANTICORROSIVE FOR COPPER

RELATED APPLICATIONS

The present application is National Phase of International Application No. PCT/JP2009/068112 filed Oct. 21, 2009, and claims priority from Japanese Application No. 2008-295757, filed Nov. 19, 2008, the disclosure of which is hereby incorporated by reference herein in its entirety.

FIELD OF INVENTION

The present invention relates to a process for treatment of water containing an azole-type anticorrosive for copper and, more particularly, relates to a process for efficiently removing an azole-type anticorrosive for copper from wastewater discharged from a chemical mechanical polishing (CMP) step in a fabrication process of a semiconductor device.

BACKGROUND OF INVENTION

In fabrication processes of semiconductor devices, large amounts of wastewater containing anticorrosives for copper are discharged from CMP steps for performing surface polishing of copper when copper wiring is installed. Therefore, treatment of the wastewater is required.

Among anticorrosives for copper, in particular, an azole-type anticorrosive for copper has an excellent anticorrosive effect. However, the azole-type anticorrosive for copper has a chemically stable structure and is not easily biodegraded. Thus, conventionally, in treating wastewater containing an azole-type anticorrosive for copper discharged from the steps, the azole-type anticorrosive for copper is decomposed using an oxidizing agent having high oxidizing power, such as ozone, ultraviolet, or hydrogen peroxide, or by an advanced oxidation process in which these oxidizing agents are combined, and then treated water is discharged or collected.

However, as described above, since the azole-type anticorrosive for copper is chemically stable, even in use of an oxidizing agent having high oxidizing power, such as ozone, addition of a large amount thereof is required for oxidative decomposition of the azole-type anticorrosive for copper, thus posing a big problem in terms of cost. In particular, in recent years, with the increase in the degree of integration in semiconductor devices, the number of fine polishing steps has been increasing, and along with this, the amount of polishing wastewater discharged has been increasing. Therefore, the increase in cost due to an increase in the capacity of wastewater treatment equipment has become a problem.

A method has been proposed, in which the pH of wastewater containing benzotriazole serving as an anticorrosive for copper is adjusted to a weakly acidic state, the treated liquid is allowed to react with an oxidizing agent in an oxidative decomposition tank, the treated liquid is further adjusted to pH 10 or more in an alkalinity adjustment tank, and the resulting copper hydroxide is subjected to solid-liquid separation (Patent Literature 1). However, even in this method, a large amount of the oxidizing agent is required to decompose a chemically stable azole-type anticorrosive for copper. Furthermore, in particular, in the case where ozone is used as an oxidizing agent, self-decomposition of ozone is suppressed under an acidic pH condition, the amount of OH radicals generated in the decomposition of ozone and having higher oxidizing power is decreased, and thus oxidizing power is also decreased, which is a problem.

Furthermore, wastewater from CMP steps contains, in addition to the azole-type anticorrosive for copper, abrasive particles (suspended solids), such as colloidal silica, used in the CMP steps. Prior to treatment with an oxidizing agent, if solid-liquid separation treatment, such as flocculation, sedimentation, or filtration, is not performed as a pretreatment, the oxidizing agent is wasted in decomposing the suspended solids. As a result, the effective utilization efficiency of the oxidizing agent decreases, and a decomposition effect that corresponds to the amount of the oxidizing agent added is not sufficiently exhibited, which is also a problem. Furthermore, in the case where the suspended solids flow in the oxidative decomposition tank, there is a possibility that the suspended solids may be deposited in the tank or clog a diffuser tube placed in the tank for injecting ozone, which may inhibit oxidation treatment.

Patent Literature 1: Japanese Unexamined Patent Application Publication No. 2002-35773

SUMMARY OF INVENTION

It is an object of the present invention to solve the conventional problems described above and to provide a process for efficiently removing an azole-type anticorrosive for copper from water containing the azole-type anticorrosive for copper, such as wastewater discharged from a CMP step in a fabrication process of a semiconductor device.

The present inventors have conducted diligent studies in order to solve the problems described above and, as a result, have found that an azole-type anticorrosive for copper can be efficiently insolubilized in the form of an iron-azole complex using ferrous ions, and can be subjected to flocculation/solid-liquid separation treatment.

Furthermore, it has been found that, since suspended solids in the wastewater can also be flocculated at the time of flocculation treatment of the resulting insoluble matter, by injecting ozone into the water from which the insoluble matter has been removed, ozone can be prevented from being wasted, and ozone can be effectively used for oxidative decomposition of TOC (total organic carbon) components including the remaining azole-type anticorrosive for copper, whereby the TOC components including the azole-type anticorrosive for copper can be decomposed and removed to a high degree using a small amount of ozone. Thereby, the present invention has been completed.

That is, a process for treatment of water containing an azole-type anticorrosive for copper according to the present invention is characterized by including adding ferrous ions to the water containing an azole-type anticorrosive for copper, and separating a resulting insoluble iron-azole complex.

According to an embodiment of the present invention, after the insoluble iron-azole complex is separated, the remaining TOC components are subjected to ozonolysis.

According to another embodiment of the present invention, the water containing an azole-type anticorrosive for copper is water discharged from a CMP step in a fabrication process of a semiconductor device.

Advantageous Effects of Invention

According to the present invention, an azole-type anticorrosive for copper in water containing the azole-type anticorrosive for copper can be efficiently insolubilized in the form of an iron-azole complex using ferrous ions, and flocculation/solid-liquid separation can be performed. Moreover, at the time of flocculation treatment, suspended solids, such as abrasive particles, in the wastewater can also be subjected to flocculation treatment.

Consequently, in the process for treatment of water containing an azole-type anticorrosive for copper according to the present invention, it is possible to treat an azole-type anticorrosive for copper and suspended solids in wastewater at low cost and efficiently, without requiring an expensive oxidizing agent, such as ozone, hydrogen peroxide, or ultraviolet.

Furthermore, the water after removal of the insoluble matter formed by the addition of ferrous ions is water from which not only the azole-type anticorrosive for copper but also suspended solids have been removed. Therefore, when an ozone-based advanced oxidation process is performed, ozone can be prevented from being wasted, and TOC components including the remaining azole-type anticorrosive for copper can be decomposed and removed to a high degree by injection of a small amount of ozone.

BRIEF DESCRIPTION OF DRAWINGS

FIG. 1 is a flow diagram showing an embodiment of a process for treatment of water containing an azole-type anticorrosive for copper according to the present invention.

FIG. 2 is a flow diagram showing another embodiment of a process for treatment of water containing an azole-type anticorrosive for copper according to the present invention.

DETAILED DESCRIPTION

Embodiments of a process for treatment of water containing an azole-type anticorrosive for copper according to the present invention will be described in detail below.

[Water Containing Azole-Type Anticorrosive for Copper]

The water containing an azole-type anticorrosive for copper, which is to be treated by the process for treatment of water containing an azole-type anticorrosive for copper according to the present invention, is not particularly limited. However, the present invention is, in particular, effective in treating wastewater discharged from a CMP step in a fabrication process of a semiconductor device and containing an azole compound serving as an anticorrosive for copper.

The azole compound serving as an anticorrosive for copper contained in the water containing an azole-type anticorrosive for copper is an aromatic five-membered ring compound containing two or more heteroatoms, at least one of the heteroatoms being a nitrogen atom.

In the present invention, any azole compound that has been conventionally used as an anticorrosive can be used. Examples of such an azole compound include imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, derivatives thereof, amine salts thereof, and metal salts thereof. Examples of azole derivatives include compounds having a fused ring of an azole ring and a benzene ring or the like, such as indazole, benzimidazole, benzotriazole, and benzothiazole, and further include derivatives thereof, such as alkylbenzotriazoles (e.g., benzotriazole, o-tolyltriazole, m-tolyltriazole, p-tolyltriazole, 5-ethylbenzotriazole, 5-n-propylbenzotriazole, 5-isobutylbenzotriazole, and 4-methylbenzotriazole), alkoxybenzotriazoles (e.g., 5-methoxybenzotriazole), alkylaminobenzotriazoles, alkylaminosulfonylbenzotriazoles, mercaptobenzotriazoles, hydroxybenzotriazoles, nitrobenzotriazoles (e.g., 4-nitrobenzotriazole), halobenzotriazoles (e.g., 5-chlorobenzotriazole), hydroxyalkylbenzotriazoles, hydrobenzotriazoles, aminobenzotriazoles, (substituted aminomethyl)-tolyltriazole, carboxybenzotriazole, N-alkylbenzotriazoles, bisbenzotriazole, naphthotriazole, mercaptobenzothiazoles, aminobenzothiazole, amine salts thereof, and metal salts thereof.

Among these compounds, 1,2,3-triazole, 1,2,4-triazole, tolyltriazole, benzotriazole, or the like is widely used as an anticorrosive for copper.

The water containing an azole-type anticorrosive for copper to be treated according to the present invention may contain only one of these azole compounds or may contain two or more of them.

Generally, wastewater discharged from a CMP step in a fabrication process of a semiconductor device contains the azole-type anticorrosive for copper in an amount of about 5 to 30,000 mg/L.

[Ferrous Ions]

In the present invention, by adding ferrous ions to water containing an azole-type anticorrosive for copper, an azole compound serving as the azole-type anticorrosive for copper is insolubilized in the form of an iron-azole complex having a high molecular weight in accordance with the following reaction:

$$Fe^{2+}+1/2O_2+2(C_2H_2N_2.NH) \rightarrow (C_2H_2N_2.N)_2Fe+2H_2O$$

The agent for allowing ferrous ions to be present in water containing an azole-type anticorrosive for copper (hereinafter, may be referred to as the "ferrous iron-containing flocculant") is not particularly limited, and examples thereof include ferrous salts, such as ferrous sulfate and ferrous chloride. These may be used alone or may be used in combination of two or more.

Among the ferrous iron-containing flocculants, in particular, ferrous sulfate is preferable because the rate of oxidation due to oxygen from air is low in a sulfate acidic solution.

In addition, in the present invention, use of ferrous ions is extremely important. When ferric ions are used, as will be shown in comparative examples later, it is not possible to obtain the effect of insolubilizing the azole compound.

The amount of the ferrous iron-containing flocculant to be added is appropriately determined depending on the content of the azole-type anticorrosive for copper in water containing the azole-type anticorrosive for copper to be treated. Generally, the ferrous iron-containing flocculant is added in an amount of 0.5 to 5.0 times, particularly preferably 0.5 to 3.0 times, by molar ratio, the amount of the azole-type anticorrosive for copper in the water containing the azole-type anticorrosive for copper. If the amount of the ferrous iron-containing flocculant added is excessively small, it is not possible to obtain a sufficient effect of insolubilizing the azole-type anticorrosive for copper. Even if the amount of the ferrous iron-containing flocculant added is increased excessively, no further effect of addition can be expected, and the amount of the agent added increases uselessly, thus being uneconomical.

Furthermore, after the ferrous iron-containing flocculant is added to water containing the azole-type anticorrosive for copper, preferably, by sufficiently stirring, the azole-type anticorrosive for copper in water containing the azole-type anticorrosive for copper is allowed to react with ferrous ions. The stirring time is 10 to 30 minutes, particularly preferably 15 to 20 minutes.

Furthermore, when the iron-azole complex is precipitated by adding ferrous ions to water containing the azole-type anticorrosive for copper, the pH is 4 to 8, particularly preferably 5 to 7. If the pH is higher than this range, bivalent iron is consumed as iron hydroxide. On the other hand, if the pH is lower than this range, iron is partially converted into monovalent negative ions, and therefore, the efficiency of formation of the iron-azole complex is decreased.

[Treatment Procedure I]

A treatment procedure of a process for treatment of water containing an azole-type anticorrosive for copper in which ferrous ions are added to the water containing an azole-type anticorrosive for copper will be specifically described below with reference to the drawing.

FIG. 1 is a flow diagram showing an embodiment of a process for treatment of water containing an azole-type anticorrosive for copper according to the present invention.

In FIG. 1, reference numeral 1 denotes a first flocculation tank, reference numeral 2 denotes a second flocculation tank, and reference numeral 3 denotes a settling tank.

In this process, raw water (water containing an azole-type anticorrosive for copper) is introduced into the first flocculation tank 1, and a ferrous iron-containing flocculant and, as necessary, a pH adjuster (acid, such as hydrochloric acid or sulfuric acid) are added thereto so as to adjust the pH preferably to 4 to 8, more preferably to 5 to 7. Then, stirring is performed preferably for 10 to 30 minutes, more preferably for 15 to 20 minutes.

In the first flocculation tank 1, the azole-type anticorrosive for copper in the raw water reacts with ferrous ions to form an iron-azole complex.

The treated water of the first flocculation tank 1 is subsequently introduced into the second flocculation tank 2, and by adding thereto an alkali, such as sodium hydroxide, potassium hydroxide, or calcium hydroxide, as a pH adjuster, the pH is adjusted preferably to 7 to 12, more preferably to 8 to 11, followed by stirring. The residence time in the second flocculation tank 2 is 5 to 15 minutes, particularly preferably about 5 to 10 minutes.

In the second flocculation tank 2, the iron-azole complex formed in the first flocculation tank 1 is further flocculated with iron hydroxide flocs to form large flocs. At the time of floc formation, suspended solids, such as abrasive particles, in the raw water are flocculated together to form flocs.

The treated water of the second flocculation tank 2 is subsequently subjected to solid-liquid separation in the settling tank 3. Prior to this, the flocs are preferably coarsened by addition of a polymer flocculant.

In FIG. 1, the polymer flocculant is added into the pipe between the second flocculation tank 2 and the settling tank 3. However, it may be possible to provide another flocculation tank, and the polymer flocculant may be added into the tank under stirring.

The amount of the polymer flocculant to be added is not particularly limited, but is preferably, usually, about 1 to 4 Mg/L.

Furthermore, the water flow LV (linear velocity) in the settling tank 3 is 0.5 to 0.8 m/hr, particularly preferably 0.7 to 0.8 m/hr.

By performing solid-liquid separation in the settling tank 3 in such a manner, together with the suspended solids in the raw water, the azole-type anticorrosive for copper insolubilized in the form of an iron-azole complex is removed. Thus, treated water in which the concentration of the azole-type anticorrosive for copper is significantly decreased can be obtained.

[Ozone Oxidation]

In the present invention, ozone is further injected into the treated water obtained by removing the insoluble iron-azole complex as described above so that TOC components including the remaining azole-type anticorrosive for copper are decomposed and removed. Thereby, the azole-type anticorrosive for copper can be further removed to a high degree.

At the time of oxidative decomposition using ozone, the azole-type anticorrosive for copper in the raw water is removed in advance, and moreover, suspended solids are also removed together with the azole-type anticorrosive for copper. Therefore, ozone can be prevented from being wasted, and efficient treatment can be carried out by injection of a small amount of ozone.

The ozonolysis treatment is preferably an ozone-based advanced oxidation process. The ozone-based advanced oxidation process is preferably performed, for example, using:
(1) a combination of ozone and an alkali,
(2) a combination of ozone and hydrogen peroxide,
(3) a combination of ozone, hydrogen peroxide, and an alkali,
(4) a combination of ozone, ultraviolet, and hydrogen peroxide,
or the like.

Among them, in the case of the combination of ozone and hydrogen peroxide, the pH condition is in the range of 8 to 12, particularly preferably in the range of 9.5 to 10.5.

The amount of hydrogen peroxide to be added is 1 to 1/20 times, particularly preferably 1/3 to 1/7 times, by weight, the amount of ozone to be injected.

The amount of ozone to be injected is set at an amount necessary for decomposition and removal of TOC components. In the present invention, in the flocculation treatment using ferrous ions prior to ozonolysis, preferably, the azole-type anticorrosive for copper and suspended solids in the raw water are removed in advance such that the required injection amount of ozone is 6 times or less, particularly, 3 times or less, by weight, the TOC concentration of the raw water.

In order to obtain treated water having a triazole concentration, in terms of TOC, of 1.5 mg/L or less by injecting such a small amount of ozone, it is preferable to obtain solid-liquid separated water having a concentration of 100 mg/L or less, for example, about 80 to 85 mg/L, by the flocculation treatment using ferrous ions described above.

Furthermore, the ozone injection method is not particularly limited. Examples of the method include a method in which a diffuser tube is placed in a bubble column to diffuse ozone, and a method using a U-tube contact tank, an ejector, a static mixer, or the like.

[Treatment Procedure II]

A treatment procedure in the case where solid-liquid separated water after treatment by adding ferrous ions to water containing an azole-type anticorrosive for copper is subjected to ozone oxidation will be specifically described below with reference to the drawing.

FIG. 2 is a flow diagram showing another embodiment of a process for treatment of water containing an azole-type anticorrosive for copper according to the present invention.

In FIG. 2, reference numeral 11 denotes a flocculation tank, reference numeral 12 denotes a settling tank, reference numeral 13 denotes a filtration device, and reference numeral 14 denotes an ozone-based advanced oxidation reaction tank.

The treatment conditions in the flocculation tank 11 and the settling tank 12 are the same as those in the first flocculation tank 1, the second flocculation tank 2, and the settling tank 3 shown in FIG. 1.

The solid-liquid separated water from the settling tank 12 is fed to the filtration device 13 in which pin flocs and impurities, such as suspended solids unreacted with the flocculant, are removed, and then the water is introduced into the ozone-based advanced oxidation reaction tank 14. Here, as the filtration device 13, a common filtration device, such as a membrane filtration device or a sand filtration device, can be used.

In the ozone-based advanced oxidation reaction tank 14, an ozone-based advanced oxidation process is performed by any of the methods (1) to (4) or the like described above, and TOC components, such as the remaining azole-type anticorrosive for copper, are decomposed and removed.

EXAMPLES

The present invention will be described more specifically below with reference to examples and comparative examples.

Note that the triazole concentrations in sample water in Examples 1 to 5 and Comparative Examples 1 to 13 were measured by a TOC analyzer "5000A" manufactured by Shimadzu Corporation. Furthermore, in Example 6 and Comparative Examples 14 to 17, measurement was performed by a 1100 series liquid chromatograph system manufactured by Hewlett-Packard Company.

Examples 1 to 5

Using the treatment equipment shown in FIG. 1, treatment was carried out in which water containing 1,2,4-triazole in an amount of 300 mg/L as TOC was used as raw water (pH 6.5).

Furthermore, in the flocculation treatment, as necessary, an acid (hydrochloric acid) or an alkali (sodium hydroxide) was added as a pH adjuster.

In the first flocculation tank 1, ferrous sulfate was added to the raw water in the amount shown in Table 1, and under the pH condition shown in Table 1, stirring was performed at 180 rpm for 20 minutes. In the second flocculation tank 2, an alkali was added to the treated water from the first flocculation tank 1, and under the pH condition shown in Table 1, stirring was performed at 60 rpm for 60 minutes. An anionic polymer flocculant ("PA-331" manufactured by Kurita Water Industries Ltd.) in an amount of 2.0 mg/L was added to the treated water from the second flocculation tank 2, and solid-liquid separation was performed in the settling tank 3. The water area of the settling tank 3 was 0.1 m², and the water flow LV was 0.8 m/hr.

The TOC concentration of the resulting treated water (solid-liquid separated water of the settling tank 3) was checked, and the result thereof is shown in Table 1.

Comparative Examples 1 to 8

Treatment was carried out as in Examples 1 to 5 except that ferric chloride was used instead of ferrous sulfate and the amount of addition thereof and the pH conditions in the first flocculation tank 1 and the second flocculation tank 2 were set as shown in Table 1. The TOC concentration of the resulting treated water is shown in Table 1.

Comparative Examples 9 to 13

Treatment was carried out as in Examples 1 to 5 except that aluminum sulfate was used instead of ferrous sulfate and the amount of addition thereof and the pH conditions in the first flocculation tank 1 and the second flocculation tank 2 were set as shown in Table 1. The TOC concentration of the resulting treated water is shown in Table 1.

TABLE 1

| | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Flocculant | Kind | Ferrous sulfate | | | | | Ferric chloride | | | | |
| | Amount of addition* (mg/L) | 500 (0.14) | 1000 (0.29) | | | 2000 (0.58) | 500 (0.1) | 1000 (0.2) | | | |
| pH in first flocculation tank | | | | 4.0 | | | | | 4.0 | | |
| pH in second flocculation tank | | 10.0 | 8.0 | 9.0 | 10.0 | 10.0 | 5.0 | 7.0 | 5.0 | 7.0 | 9.0 |
| TOC concentration of treated water (mg/L) | | 264 | 198 | 196 | 198 | 54 | 291 | 283 | 284 | 276 | 294 |

| | | Comparative Examples | | | | | | | |
|---|---|---|---|---|---|---|---|---|---|
| | | 6 | 7 | 8 | 9 | 10 | 11 | 12 | 13 |
| Flocculant | Kind | Ferric chloride | | | | Aluminum sulfate | | | |
| | Amount of addition* (mg/L) | 2000 (0.4) | | | 500 (0.39) | 1000 (0.78) | | | 2000 (1.57) |
| pH in first flocculation tank | | | 4.0 | | | | 3.0 | | |
| pH in second flocculation tank | | 5.0 | 7.0 | 9.0 | 6.0 | 6.0 | 7.0 | 8.0 | 6.0 |
| TOC concentration of treated water (mg/L) | | 292 | 275 | 269 | 305 | 295 | 293 | 301 | 274 |

*Molar ratio relative to triazole is shown in parentheses.

As is evident from Table 1, by using the required amount of ferrous sulfate, triazole can be efficiently flocculated and separated (Examples 1 to 5).

In contrast, when ferric chloride or aluminum sulfate was used, even if the amount of addition thereof was increased, triazole was hardly removed (Comparative Examples 1 to 13).

Example 6

Wastewater containing triazole in an amount of 180 mg/L, as TOC concentration, was used as raw water (360 mg/L as TOC), and 5,000 mg/L of ferrous sulfate (2.4 molar times relative to triazole) was added thereto. The pH was adjusted to 3 with hydrochloric acid, and stirring was performed for 30 minutes. Subsequently, the pH was adjusted to 10 by addition of calcium hydroxide, followed by stirring for 20 minutes. An anionic polymer flocculant ("PA-331" manufactured by Kurita Water Industries Ltd.) in an amount of 2.0 mg/L was further added thereto, followed by stirring for 20 minutes to perform flocculation treatment. Then, filtration was performed with No. 5 filter paper (manufactured by ADVANTEC Toyo Kaisha, Ltd.). The TOC concentration of the resulting flocculation-treated water was as shown in Table 2.

The flocculation-treated water was placed in a 15-L column (diameter: 150 mm, material: transparent vinyl chloride). Hydrogen peroxide was added thereto, and at the same time, ozone gas with an ozone concentration of 150 g/Nm³ generated by an ozone generator ("GR-RD" manufactured by Sumitomo Precision Products Co., Ltd.) was injected at 2 NL/min from the bottom of the column through a diffuser tube (Kinoshita-type ball filter). Thereby, an ozone-based advanced oxidation process was performed. In order to maintain a constant pH (pH 10) during the treatment, a 5N aqueous sodium hydroxide solution was injected using a chemical feeding pump ("EH-B10VH-100PW1-PH1" manufactured by IWAKI Co., Ltd).

In this treatment, the ozone injection amount (g) calculated in accordance with the formula below was as shown in Table 2.

Ozone concentration×flow rate×ozone injection time/
1,000=150 g/Nm³×2 NL/min×ozone injection
time(min)/1,000

Furthermore, the amount of hydrogen peroxide added was set such that $O_3/H_2O_2$ (weight ratio) was 5.0.

The TOC concentration of the resulting treated water was checked, and the result thereof is shown in Table 2.

Comparative Examples 14 and 15

Treatment was carried out as in Example 6 except that in the flocculation treatment of the raw water, polyferric sulfate was used instead of ferrous sulfate, and the ozone injection amount was set at the amount shown in Table 2. The results there of are shown in Table 2.

Comparative Examples 16 and 17

Treatment was carried out as in Example 6 except that the flocculation treatment of the raw water was not performed, the raw water was directly subjected to the ozone-based advanced oxidation process, and the ozone injection amount in the process was set at the amount shown in Table 2. The results thereof are shown in Table 2.

TABLE 2

|  |  | Example 6 | Comparative Example 14 | Comparative Example 15 | Comparative Example 16 | Comparative Example 17 |
| --- | --- | --- | --- | --- | --- | --- |
| Flocculation treatment |  | Performed | Performed | Performed | Not performed | Not performed |
| Kind of flocculant |  | Ferrous sulfate | Polyferric sulfate | Polyferric sulfate | — | — |
| Ozone injection amount (g) in ozone-based advanced oxidation process |  | 5.4 | 5.4 | 10.8 | 5.4 | 21.6 |
| Raw water | TOC concentration (mg/L) | 360 | 360 | 360 | 360 | 360 |
|  | Triazole concentration (mg/L) | 180 | 180 | 180 | 180 | 180 |
| Flocculation-treated water | TOC concentration (mg/L) | 180 | 350 | 350 | — | — |
|  | Triazole concentration (mg/L) | 90 | 170 | 170 | — | — |
| Treated water after ozone-based advanced oxidation process | TOC concentration (mg/L) | 120 | 280 | 180 | 300 | 120 |
|  | Triazole concentration (mg/L) | <1.5 | 10 | <1.5 | 20 | <1.5 |

The followings are evident from Table 2.

In the case where, without performing the flocculation treatment of the raw water, the ozone-based advanced oxidation process is directly performed, in order to sufficiently decompose and remove triazole, a large amount, i.e., 21.6 g, of ozone is required (Comparative Examples 16 and 17).

In the case where the flocculation treatment of the raw water is performed, but the ferric salt is used as the flocculant, it is not possible to remove triazole by the flocculation treatment. In order to sufficiently decompose and remove triazole, an amount as large as 10.8 g of ozone is required (Comparative Examples 14 and 15). However, in this case, since suspended solids in wastewater are removed by the flocculation treatment, ozone is prevented from being wasted, and the required amount of ozone is decreased compared with the case where the flocculation treatment is not performed.

In contrast, in the case where the flocculation treatment is performed using the ferrous salt, and then the ozone-based advanced oxidation process is performed, triazole can be decomposed and removed to an extremely small concentration with a very small amount, i.e., 5.4 g, of ozone (Example 6).

While the present invention has been described in detail with reference to the specific embodiments, it is apparent to persons skilled in the art that the embodiments may be subjected to various modifications without departing from the spirit and scope of the present invention.

This application is based on Japanese Patent Application (Patent Application No. 2008-295757) filed on Nov. 19, 2008, which is hereby incorporated by reference herein in its entirety.

The invention claimed is:

1. A process for treatment of water containing an azole-type anticorrosive for copper, comprising:
adding ferrous ions to the water containing the azole-type anticorrosive for copper and having a pH of 4-8, thereby precipitating an insoluble iron-azole complex, and separating the insoluble iron-azole complex,
wherein an amount of the ferrous ions added is 0.5 to 5.0 times, by molar ratio, an amount of the azole-type anticorrosive for copper in the water containing the azole-type anticorrosive for copper, and
after the insoluble iron-azole complex is separated, remaining total organic carbon (TOC) components are subjected to an ozone treatment.

2. The process for treatment of water containing an azole-type anticorrosive for copper according to claim 1, wherein the water containing the azole-type anticorrosive for copper is water discharged from a chemical mechanical polishing step in a fabrication process of a semiconductor device.

3. The process for treatment of water containing an azole-type anticorrosive for copper according to claim 1, wherein the ferrous ions are added to the water containing the azole-type anticorrosive for copper by adding a ferrous salt comprising at least one of ferrous sulfate and ferrous chloride.

4. The process for treatment of water containing an azole-type anticorrosive for copper according to claim 3, wherein the ferrous salt is added in an amount of 0.5 to 5.0 times, by molar ratio, the amount of the azole-type anticorrosive for copper in the water containing the azole-type anticorrosive for copper.

5. The process for treatment of water containing an azole-type anticorrosive for copper according to claim 1, wherein after the iron-azole complex is precipitated, the pH of the water is adjusted to 7 to 12, and the iron-azole complex is flocculated with iron hydroxide flocs.

6. The process for treatment of water containing an azole-type anticorrosive for copper according to claim 5, wherein subsequently, a polymer flocculant is added to the water.

7. The process for treatment of water containing an azole-type anticorrosive for copper according to claim 1, further comprising stirring the ferrous ions and the water containing the azole-type anticorrosive for copper for 10 to 30 minutes after the ferrous ions are added.

8. A process for treatment of water containing an azole-type anticorrosive for copper, comprising:
adding ferrous ions to the water containing the azole-type anticorrosive for copper and having a pH of 4-8, thereby precipitating an insoluble iron-azole complex, and
separating the insoluble iron-azole complex,
wherein an amount of the ferrous ions added is 0.5 to 5.0 times, by molar ratio, an amount of the azole-type anticorrosive for copper in the water containing the azole-type anticorrosive for copper,
the azole-type anticorrosive for copper contains an azole compound, and
the azole compound is at least one selected from the group consisting of imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, derivatives thereof, amine salts thereof, and metal salts thereof.

9. The process for treatment of water containing an azole-type anticorrosive for copper according to claim 8, wherein the water containing the azole-type anticorrosive for copper contains the azole compound in an amount of 5 to 30,000 mg/L.

* * * * *